United States Patent [19]
Oehring

[11] 3,847,249
[45] Nov. 12, 1974

[54] AXLE LUBRICATION SYSTEM

[75] Inventor: Leo George Oehring, Wyandotte, Mich.

[73] Assignee: North American Rockwell Corporation, Pittsburgh, Pa.

[22] Filed: Aug. 24, 1972

[21] Appl. No.: 283,583

[52] U.S. Cl. ............................. 184/6.12, 184/11 R
[51] Int. Cl. .............................................. F16n 7/26
[58] Field of Search..... 184/11 R, 11 A, 11 B, 6.12, 184/6.25, 6.24; 74/606 A

[56] References Cited
UNITED STATES PATENTS

| | | | |
|---|---|---|---|
| 1,611,314 | 12/1926 | Meeks | 184/11 B |
| 1,631,594 | 6/1927 | Kaegi | 184/11 B |
| 2,046,282 | 6/1936 | Wert | 184/6.12 X |
| 2,356,953 | 8/1944 | Snow | 184/13 R |
| 2,677,440 | 5/1954 | Willis | 184/6.25 X |
| 3,502,176 | 3/1970 | Terry | 184/11 R |

*Primary Examiner*—Manuel A. Antonakas

[57] ABSTRACT

A lubricant filter and distribution system for power transmitting gearing as is included in automotive vehicle drive axles in which lubricant centrifugally thrown from the axle differential mechanism is collected in a receptacle from which the lubricant is gravity fed through filters toward each end of the differential mechanism and its bearings whereby the lubricant for the differential mechanism is continuously cleansed of particulate impurities. In one form of the invention, a magnetic particle separator is included.

7 Claims, 4 Drawing Figures

3,847,249

AXLE LUBRICATION SYSTEM

BACKGROUND OF INVENTION

This invention relates to an apparatus for filtering the lubricant in a power transmitting gear box such as is included in differentials for vehicle drive axles and, more particularly, relates to a lubricant collection and filter apparatus associated with the ring gear and differential of an automotive drive axle.

In order to lubricate the moving parts of gear boxes such as differential housings used in automotive drive axles, the gear box housing is usually provided with a lubricant reservoir therein and the large moving gear of the included gear train move through the lubricant reservoir and pick up lubricant therefrom. In a drive axle differential housing, it is the movement of the ring gear and casing of the differential that cause lubricant movement. This lubricant is then distributed to the parts of the differential as required.

During vehicle operation, various particles, both foreign and produced within the gear box, are present in the lubricant. In a vehicle drive axle differential, foundry sand and lapping compound often may be present due to insufficient cleaning of the housing. During service additional nonmetallic materials such as dust, sand and road grime may enter the lubricant through seals and breathers. In addition, working of a gear train causes particles of metal to be produced that are present in the lubricant during the use of the vehicle. All these particles continuously circulate with the lubricant during operation of the vehicle because the lubricant in the reservoir is continuously agitated by the ring gear and casing so that the particles are held in suspension therein. These particles can cause unduly rapid wear of the gear train and in particular antifriction bearing lapping parts because of their abrasive effect or because they hinder the adequate flow of lubricant. In extreme cases, such particles can even cause failure of the bearings.

While various lubricant filtering devices have been suggested, such devices are not well adapted for use in conjunction with gear boxes including differentials, particularly a differential in an automotive drive axle. External lubricant filtering circuits are expensive both to provide and maintain; they require space which may not be available on the truck chassis, and, being external, they are easily damaged.

More recently, internal lubricant filters have been provided within the differential, circulation of the lubricant through the filter media being achieved by the use of centrifugal force developed by the rotation of the ring gear. In such systems the filter capacity prior to clogging of the filter is quite limited, the construction rather complicated and expensive and maintenance is rather time consuming.

The structure illustrated in U.S. Pat. No. 3,502,177 issued Mar. 24, 1970 to C. D. Christie for "Filter Mechanism for Two-Speed Axle" is typical of such prior internal lubricant filtration systems for vehicle drive axles.

Various forms of lubricant filtration and distribution systems which have been developed for automotive use other than on axles will be found in U.S. Pat. No. 1,441,857 issued Jan. 9, 1923 to J. S. Johnson for "Oil Strainer for Automobile Engines", in U.S. Pat. No. 1,536,756 issued May 5, 1925 to C. G. G. Bergstrom for "Attachment for Vehicle Transmissions" and U.S. Pat. No. 1,631,594 issued June 7, 1927 to E. Kaegi for "Oil Filter"

SUMMARY OF INVENTION

The present invention provides a lubricant filtration and distribution system for a gear box such as for automotive vehicle axle differentials which is simple and inexpensive to construct, easy to service when required, and reliable in operation and which requires only infrequent service. Specifically, it provided a lubricant receptacle disposed between the periphery of the large rotating gear train member such as a differential ring gear and the top of the gear box housing to collect lubricant thrown from the gear and dripping from the housing internal top wall and at least one filter unit through which the lubricant flows by gravity toward the moving gear train parts and support bearings. The filter unit provides a relatively large area for lubricant flow, a large area for filtered lubricant distribution, and a particle collection cavity in which separated solid particles can accumulate without adversely affecting the filtration function by filter media blockage. The filter units are easily accessible and readily removable for replacement or cleaning. In one form, mechanical filtration is supplemented by magnetic separation of metallic particles from the lubricant.

A further feature of the lubricant filtration and distribution system of the present invention as applied to a vehicle drive axle is that, being mounted on the axle housing itself and symmetrically disposed with reference to the differential bearings supports, it provides effective lubricant distribution to the differential mechanisms and their bearings and is operable and completely effective, without modification, regardless of which of the differential support bearings the teeth of the ring gear face.

DESCRIPTION OF DRAWINGS

FIG. 3 is a fragmentary sectional view substantially slong the line 3—3 of FIG. 2;

DETAILED DESCRIPTION

Figure 1:
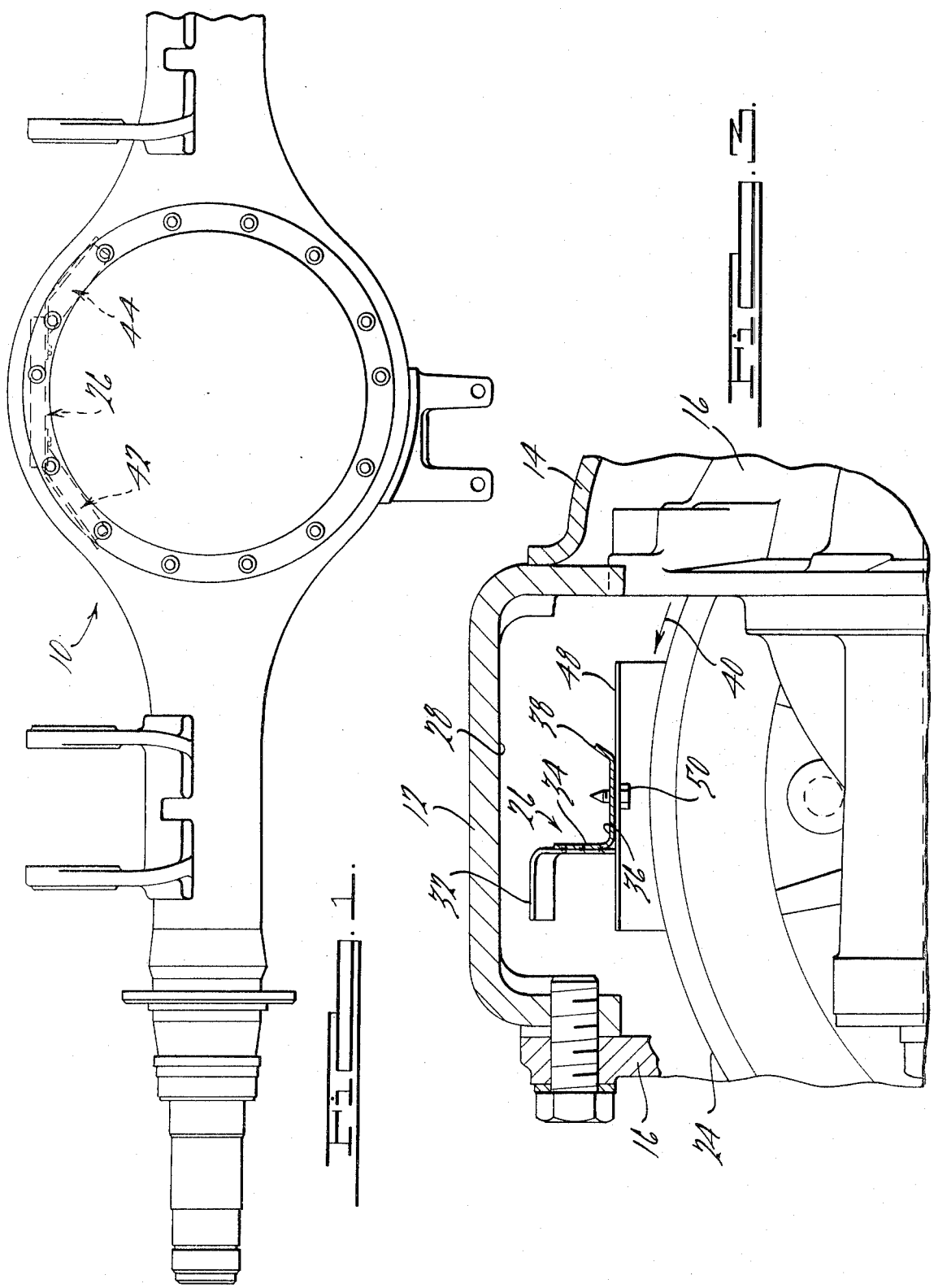
FIG. 1 is a fragmentary elevational view of an axle housing showing the lubricant filtration and distribution system of the invention but with the axle differential and its carrier removed.

The automotive vehicle drive axle assembly 10 illustrated in the drawings is of the general type illustrated in U.S. Pat. No. 2,870,854 issued Jan. 27, 1959 to B. W. Keese for "Tandem Axle Drive and Lubricating Means Therefor" and, insofar as the present invention is concerned, may be any type of vehicle drive axle.

Figure 2:
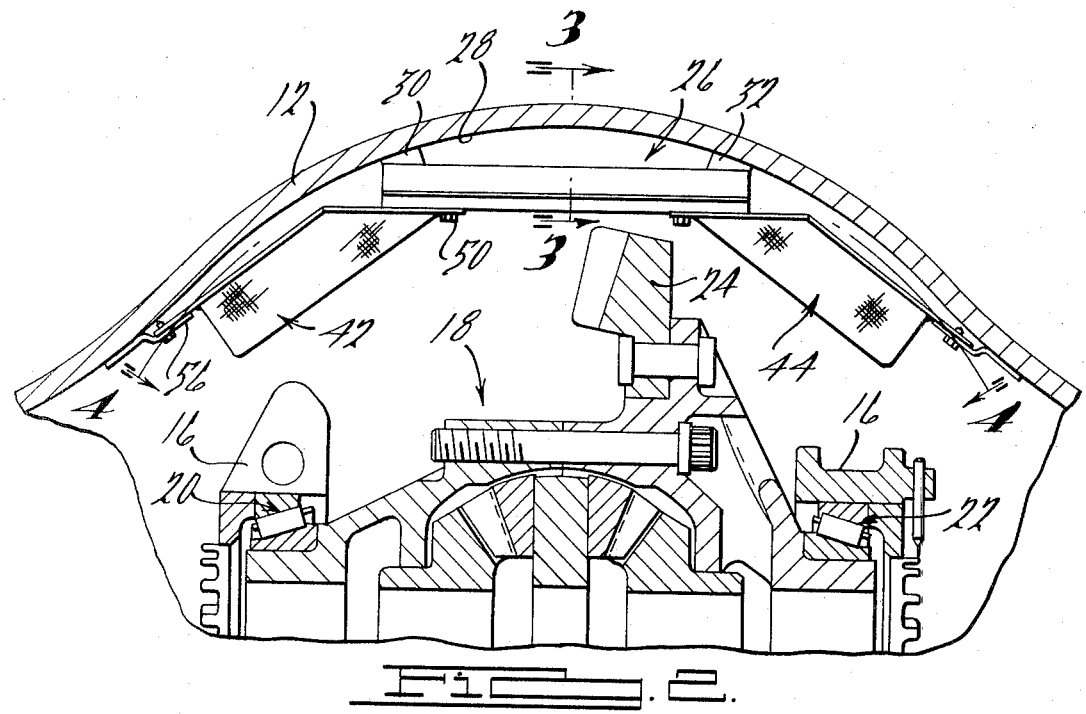
FIG. 2 is a longitudinal sectional view through the upper half of the axle assembly of the present invention illustrating the relationship between the differential carrier, the differential, the differential bearings and the lubricant filtration and distribution system within the axle housing in accordance with the present invention.

The axle assembly 10 comprises an elongated housing 12 having a rear opening closed by a cover 14 (which effectively forms part of the housing 12) and a front opening over which is secured the differential carrier 16. The differential mechanism 18, as shown in FIG. 2, is journalled by spaced antifriction bearings 20 and 22 upon the carrier 16 and is supported by the carrier within the axle housing 12. The chamber defined by the housing 12, its cover 14 and the differential carrier 16 in which the differential mechanism 18 is enclosed provides a sump at the bottom in which the lower portion of the differential mechanism 18 and the ring gear 24 thereon are immersed. Similarly, housing 12, cover 14 and carrier 16 form a dome over the differential mechanism 18 and ring gear 24 toward and against which lubricating oil is thrown centrifugally from the differential mechanism 18 and ring gear 24 as they rotate.

The lubricant filtration and distribution system of the present invention provides a receptacle 26 in the form of an elongated sheet metal trough extending longitudinally of the housing 12 and mounted against the top wall 28 thereof by brackets 30 and 32. The brackets 30 and 32 are secured to the housing wall 28 by welding or by rivets. They are secured to the higher wall 34 of the trough shaped receptacle 26, preferably by spot welding.

Figure 4:
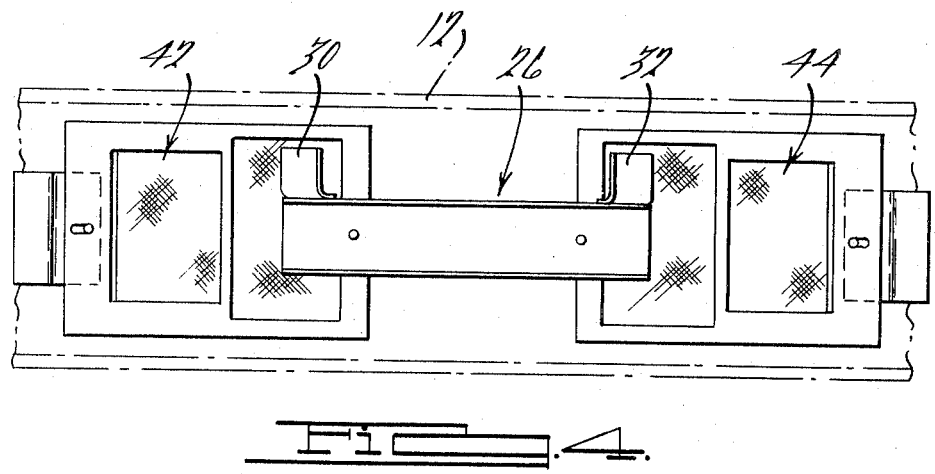
FIG. 4 is an irregular section showing the lubricant collection, filtration and distribution system of the present invention, the section being taken substantially along the line 4—4 of FIG. 2.

As is most clearly apparent from FIGS. 3 and 4, the receptacle 26 is open at each end, has a generally horizontal bottom wall 36, a high wall 34 and a relatively low lip 38 defining a trough or channel. As is apparent from FIG. 2, the receptacle 26 is disposed symmetrically with respect to the center of the differential mechanism 18 and is spaced from the wall 28 of the housing 12.

The direction of the rotation of the ring gear 24 during forward drive of the vehicle is indicated by the arrow 40 in FIG. 3. Rotation of the ring gear 24 in the direction of arrow 40 will throw lubricating oil by centrifugal force against the wall 28 of the housing 12 and over the lip 38 of the receptacle 26 against its higher wall 34 for accumulation within the receptacle 26 and outward flow therefrom through its open opposite ends.

As is apparent from FIGS. 2 and 4, lubricant flowing from the opposite ends of the receptacle 26 passes through inlet openings into the filter units 42 and 44.

In any particular installation, the filter units 42 and 44 are preferably identical. In the preferred illustrated form the filter units comprise a sheet metal base plate 46 having a generally horizontal portion 48 underlying the bottom wall 36 of the receptacle 26 and formed with an inlet aperture therethrough through which lubricant flowing from the open end of the trough shaped receptacle 26 passes. The portion 48 of the base plate 46 is secured to the bottom wall 36 of the trough shaped receptacle 26 by a self tapping screw 50. The remainder of the base plate 46 indicated at 52 extends downwardly along the wall 28 of the housing 12 at an obtuse angle to portion 48 and projects between the wall 28 and the portion 54 of a retaining clip 56 secured to the housing wall 28 at 58 as by welding or riveting.

As is apparent, therefore, the filter unit 42 is supported in position by the clip 56 and the screw 50. By removal of the screw 50, the filter unit 42 can be moved to disengage it from the clip 56 and then removed from the housing 12 for replacement or cleaning depending upon its structure.

In one preferred form, the remainder of the filter unit 42 is formed of wire cloth formed in a generally rectangular open topped receptacle 59 having a base wall 60, a lower end wall 62 and spaced sidewall 64 and secured along its edges to the bottom surface of the base member 46 to define therewith a hollow chamber into which lubricant passes from the receptacle 26.

An important feature of the filter unit 42 is the fact that it has porous bottom and side surfaces so that as particulate debris accumulates within the chamber it will collect against the wall 62 and the lower portion of the walls 60 and 64 while permitting free flow of oil through the remaining portions of the walls 60 and 64. The normal vibration of the axle as the vehicle moves will cause the accumulated particles to migrate by gravity toward the lower end of the receptacle 59.

When the filter unit 42 is constructed as just described, it normally need be removed only during normal servicing of the differential mechanism, to be emptied and cleaned or replaced.

Alternatively, the filter unit 42 can be a disposable paper filter of a more or less conventional type in which pleated paper is formed into an annulus, lubricant passing radially inward into the pleats, through the pleated filter paper and being discharged axially from the center of the annulus.

In installations in which the accumulation of fine iron and steel particles in the lubricant is excessive or in which they are so fine that they cannot be readily removed by mechanical filtration, the present invention provides for the magnetic separation of these particles by placing a permanent magnet (not shown) within the receptacle 26 against the base wall 36. The receptacle 26 being formed of steel, the permanent magnet is retained in place without the provision of any attaching device.

To recapitulate, as the differential mechanism 18 is driven in a forward direction, oil is picked up by it and by the ring gear 24 and thrown against the dome of the housing 12 from which part of it drips into the receptacle 26 and is also thrown directly into the receptacle 26. The oil that collects in the receptacle 26 flows from the opposite ends thereof into the filter units 42 and 44 in which the solid particles suspended in the lubricant are retained and from which the liquid lubricant drains back over the differential mechanism 18 toward its bearings 20 and 22 and back into the sump formed at the bottom of the housing 12. In addition, magnetizable particles suspended in the lubricant may be magnetically separated within the trough 26.

I claim:

1. In combination in an automotive wheel axle assembly having an axle housing, a differential carrier mounted on said housing, a differential mechanism rotatably mounted on said carrier by spaced bearings, and a ring gear secured to the exterior of said differential mechanism and by which said differential mechanism is driven, said housing and said carrier providing an oil sump in the lower portion of said axle assembly in which said ring gear is immersed and a dome over said ring gear against which oil is centrifugally thrown from said ring gear as said differential mechanism is driven, the improvement comprising:

a. an open top lubricant receptacle suspended in said housing above said ring gear and beneath said dome to collect lubricant thrown from said ring gear and dripping from said dome said receptacle comprising an elongated trough extending longitudinally of said axle housing,
b. said receptacle having at each end of said trough outlets through which collected lubricant can flow by gravity,
c. oil filter units interposed in the path of flow from said outlets and having their inlets disposed beneath the open ends of said trough,
d. said oil filter units each including a cavity in which separated particles may accumulate without impairing the functioning of the filter unit.

2. The combination as defined in claim 1 further comprising magnetic means disposed in said receptacle to mechanically separate magnetically attractable particles from the lubricant collected in said receptacle.

3. The combination defined in claim 1 wherein said filter units are detachably secured to said housing and receptacle and removable for servicing.

4. The combination defined in claim 3 wherein said filter units are each retained in position by engagement of a flange thereon with a clip secured to the housing dome and by a single screw secured to said trough whereby each of said filter cartridges may be easily removed for replacement or cleaning by removal of said single screw.

5. The combination defined in claim 1 wherein each of said filter units comprises a receptacle the bottom and sidewalls of which are formed of wire mesh.

6. The combination defined in claim 1 wherein each of said filter units comprises a radial flow pleated paper filter element.

7. In combination in a power transmitting gear box having a housing, gear train means rotatably mounted within said housing by spaced bearings, said housing defining a liquid lubricant sump in the lower portion thereof in the path of movement of at least one member of said gear train means and a dome in the upper portion thereof above said element against which lubricant is centrifugally thrown from said element during movement of the gear train means, the improvement comprising:
a. an open top lubricant receptacle comprising an elongated trough suspended in said housing above said element and beneath said dome to collect lubricant thrown from said element and dripping from said dome,
b. said trough having an outlet through which collected lubricant can flow by gravity,
c. an oil filter unit having an upwardly open inlet positioned in the path of lubricant flow from said trough outlet at a lower level than the outlet of said trough,
d. said oil filter unit including a cavity in which separated particles may accumulate without impairing the functioning of the filter unit.

* * * * *